US009600834B2

(12) United States Patent
Kilroy et al.

(10) Patent No.: US 9,600,834 B2
(45) Date of Patent: Mar. 21, 2017

(54) AGGREGATING DATA FROM MULTIPLE DEVICES BELONGING TO ONE USER FOR DIRECTED AD TARGETING

(75) Inventors: Jonathan Kilroy, Champaign, IL (US); Dale Nussel, Mahomet, IL (US); Anupam Seth, Urbana, IL (US); Allie K. Watfa, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 339 days.

(21) Appl. No.: 13/282,180

(22) Filed: Oct. 26, 2011

(65) Prior Publication Data

US 2013/0110623 A1 May 2, 2013

(51) Int. Cl.
*G06Q 30/02* (2012.01)

(52) U.S. Cl.
CPC ..... *G06Q 30/0271* (2013.01); *G06Q 30/0277* (2013.01)

(58) Field of Classification Search
USPC ...... 705/14.53, 14.64, 14.66, 14.73; 709/228
See application file for complete search history.

(56) References Cited

U.S. PATENT DOCUMENTS

| 7,356,015 | B2 * | 4/2008 | Ibe et al. .................... 370/338 |
| 7,657,594 | B2 * | 2/2010 | Banga et al. ................ 709/203 |
| 7,853,474 | B2 * | 12/2010 | Ullah ........................... 705/7.31 |
| 7,886,065 | B1 * | 2/2011 | Satish ................... G06F 21/554 370/352 |
| 8,260,665 | B2 * | 9/2012 | Foladare ............... G06Q 30/02 705/14.5 |
| 8,447,652 | B2 * | 5/2013 | Watfa et al. ............... 705/14.64 |
| 8,862,730 | B1 * | 10/2014 | Hernacki ............ H04L 63/1408 709/224 |
| 9,191,509 | B2 * | 11/2015 | Jones ...................... G06Q 30/02 |
| 2002/0123928 | A1 * | 9/2002 | Eldering et al. ............... 705/14 |
| 2006/0265507 | A1 * | 11/2006 | Banga et al. ................ 709/228 |
| 2011/0302033 | A1 * | 12/2011 | Lee et al. .................. 705/14.57 |
| 2012/0084203 | A1 * | 4/2012 | Mehew ................. G06Q 20/40 705/41 |
| 2013/0290233 | A1 * | 10/2013 | Ferren et al. .................. 706/46 |

OTHER PUBLICATIONS

Angwin, J., & Valentino-DeVries, J. (Dec. 1, 2010). What they know: A wall street journal investigation: Race is on to 'fingerprint' phones, PCs. Wall Street Journal. Retrieved from http://search.proquest.com/docview/814956073?accountid=14753. Also available at http://online.wsj.com/news/articles/SB10001424052748704679204575646704100959546.*

(Continued)

*Primary Examiner* — Namrata Boveja
*Assistant Examiner* — Shawn Lillemo
(74) *Attorney, Agent, or Firm* — Cooper Legal Group, LLC (57) ABSTRACT

Targeting advertisements to a user on multiple devices includes: selecting an access point; maintaining an internet access log to track web activity across multiple devices within said access point; identifying the multiple devices involved in the web activity; distinguishing patterns of web activity for the multiple devices to identify users of the devices; generating a user interest vector populated with user interests derived from the patterns of web activity; initializing a master log of user interest vectors for all users within the access point, wherein the master log maps the users with the multiple devices; and updating the master log.

21 Claims, 5 Drawing Sheets

(56) References Cited

OTHER PUBLICATIONS

The American Heritage® Science Dictionary (2002).*
Marketingterms.com: The Digital Marketing Reference, available at http://www.marketingterms.com/dictionary/conversion_rate/.*
Peter Eckersley, How Unique is your Web Browser?, Electronic Frontier Foundation (2010), available at https://panopticlick.eff.org/browser-uniqueness.pdf (discussing the information entropy of device fingerprinting).*
Richard J. Fickelscherer, Douglas H. Lenz, Daniel L. Chester, "Fuzzy Logic Based Real-Time Predictive Process Fault Analysis," The Instrumentation, Systems and Automation Society, ISA EXPO 2004.

* cited by examiner

| Time | Websites | Device | App Use | App Organization |
|---|---|---|---|---|
| 10:00 - 10:15 | Yahoo! Home Page | D0 | McAfee | Anti-virus on start-up |
| 10:15 - 10:25 | Sports | D2 | | Sports site second |
| 15:00 - 15:30 | ITunes | D2 | ITunes | ITunes for an extended period of time |
| 18:40 - 19:30 | Y! Finance | D3 | E*Trade | On-line banking accessed |
| 21:00 - 21:20 | Gmail, Amazon | D7 | Email | Email, then shopping |

| User | Trends | App | Device ID | Possible Device ID |
|---|---|---|---|---|
| A0 | home page: Y! accesses on connect: Y! fantasy | Gmail Amazon | D0, D1 | D2, D3 |
| A1 | Home page: Ebay Access on connect: Gmail | Gmail Y!mail | D7 | D2 |
| A2 | Home page: Google Access on connect: Gmail | Gmail Y!mail | D7 | D2 |
| | | | | |
| | | | | |

| Internet Access Log |||||
|---|---|---|---|---|
| Date/Time | Address | Service | IP Address | Device/port |
| 20111022075032 | www.abc.com/news/images... | www proxy | 204.42.0.6 | D0/b2 |
| 20111022090040 | www.def.com/sports/.... | www proxy | 204.42.0.15 | D2/a1 |
| 20111022091520 | www.ghi.com/images/.... | www proxy | 204.42.0.06 | D0/b2 |
| 20111022113025 | www.jkl.com/events/.... | www proxy | 204.42.0.15 | D2/a1 |
| ... | ... | ... | ... | ... |
|  |  |  |  |  |

FIG. 6

AGGREGATING DATA FROM MULTIPLE DEVICES BELONGING TO ONE USER FOR DIRECTED AD TARGETING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of on-line advertising, and more particularly relates to the field of directed advertisement targeting by associating multiple devices to one user.

BACKGROUND OF THE INVENTION

Today's computer users have multiple devices connecting to the Internet: smart phones, tablets, laptops, desktop PC, TVs, gaming consoles, and the like. A person tends to use the gateways in a pattern according to his/her needs and personality. However, because computer users don't always need to log in to websites, the advertisers don't have easy access to the information needed for optimal ad targeting.

Without logging in, a person who typically uses his smart phone all day long to check stock prices, a desktop machine at home to play online games, and a tablet to read celebrity gossip will never find a convergence on the ads that he/she will definitely like no matter what device is being used. Only when this user logs in and a user profile can be accessed will it be possible to target advertisements (ads) for that user. And since a user today is likely to engage in multiple Internet activities on multiple devices without logging in on all of those devices, valuable opportunities are missed.

There is a need for a system and method to allow targeted marketing for users on all of their devices.

SUMMARY OF THE INVENTION

Briefly, according to an embodiment of the invention a method for targeting advertisements to a user on multiple devices includes steps or acts of: selecting an access point; maintaining an internet access log to track web activity across multiple devices within said access point; identifying the multiple devices involved in the web activity; distinguishing patterns of web activity for the multiple devices to identify users of the devices; generating a user interest vector populated with user interests derived from the patterns of web activity; initializing a master log of user interest vectors for all users within the access point, wherein the master log maps the users with the multiple devices; and updating the master log.

According to another embodiment of the present invention, a system for targeting advertisements to a user on multiple devices includes a memory that holds computer program instructions for: selecting an access point; maintaining an internet access log to track web activity across multiple devices within said access point; identifying the multiple devices involved in the web activity; distinguishing patterns of web activity for the multiple devices to identify users of the devices; generating a user interest vector populated with user interests derived from the patterns of web activity; initializing a master log of user interest vectors for all users within the access point, wherein the master log maps the users with the multiple devices; and updating the master log. The system further includes a processor device for executing the instructions from memory. The system can further include storage for storing the master log.

According to another embodiment of the present invention, a computer program product includes a non-transitory computer storage medium with computer program instructions stored therein for targeting advertisements to a user on multiple devices.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system and method for identifying and targeting a specific user by the aggregation of data from multiple devices in use by the specific user. We are able to track patterns of web activity across the different devices to obtain and/or refine a user profile to be used for more accurate ad targeting. In addition, when one of the devices is a mobile device, we leverage geo-spatial data/network access points to do the same across multiple physical locations. For example, assume we have tracked patterns of web activity from a mobile device within access point A. The geo-location feature associated with the mobile device lets us know the device is moving within access point B. Now we track the web activity for all devices on this new access point B.

We are able to automate the mapping of multiple devices to a specific user so that relevant, targeted advertisements can be served to that specific user on all of his/her devices. By identifying the multiple devices, we then recognize when the user is engaging in web activity on one of the devices (even if not logged in). Once we have mapped a user to his/her devices, we can pull up a profile of that user to relate the user's likes and dislikes to target specific ads to that user on any of the user's devices, whether or not the user is logged in. Quite often a user employs multiple devices for web access without logging in to any web account, thus making it virtually impossible to directly target the user for marketing purposes. According to an embodiment of the present invention, the opportunity to map the device to the user without the user logging in creates many opportunities to target the user with the appropriate ad.

Benefits and Advantages of the Invention

This method of directed ad targeting has many advantages, some of which we list here: a) We are able to enable more personalized ad targeting to users who do not need to log in to a site; better targeting leads to increased revenue; b) We can serve different personalized ads on the same IP address; c) Audience targeting is faster and easier to analyze; d) This method can be used in devices with minimal processing power, such as mobile devices; and e) The mapping/grouping cluster will be small in size, therefore selecting the most relevant targeted ads can be processed faster.

Figure 1:
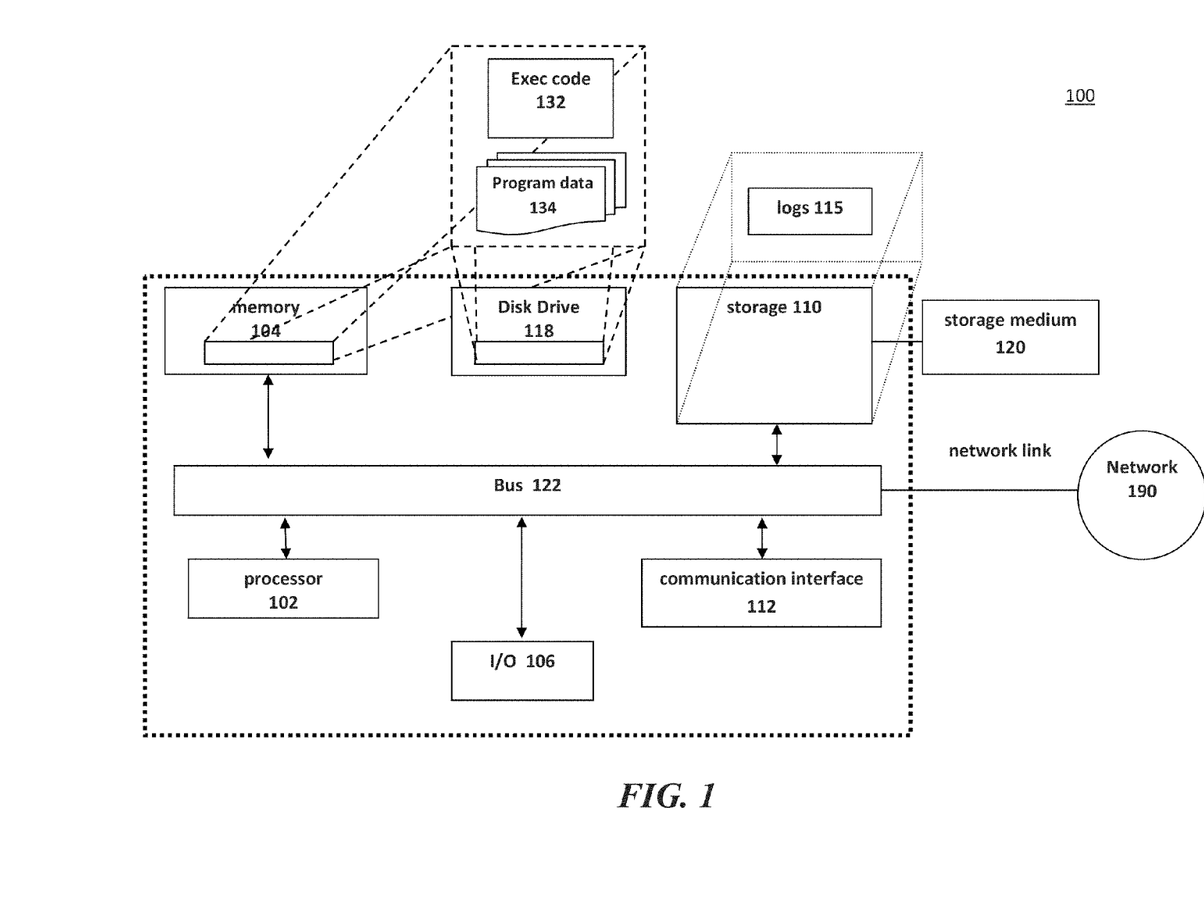
FIG. 1 is a high level block diagram showing an information processing system configured to operate according to an embodiment of the present invention.

FIG. 1 Hardware Embodiment.

Referring now in specific detail to the drawings, and particularly to FIG. 1, there is provided a simplified pictorial illustration of an information processing system for ad targeting in which the present invention may be implemented. For purposes of this invention, computer system 100 may represent any type of computer, information processing system or other programmable electronic device, including a client computer, a server computer, a portable computer, an embedded controller, a personal digital assistant, and so on. The computer system 100 may be a stand-alone device or networked into a larger system. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100 via one or more data networks such as, for example, network 110. However, for ease of understanding, aspects of the invention have been embodied in a single computing device—computer system 100.

Computer system 100 includes processing device 102 which communicates with an input/output subsystem 106, memory 104, storage 110 and network 110. The processor device 102 is operably coupled with a communication infrastructure 122 (e.g., a communications bus, cross-over bar, or network). The processor device 102 may be a general or special purpose microprocessor operating under control of computer program instructions 132 executed from memory 104 on program data 134. The processor 102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 104 may be partitioned or otherwise mapped to reflect the boundaries of the various memory subcomponents. Memory 104 may include both volatile and persistent memory for the storage of: operational instructions 132 for execution by processor device 102, data registers, application storage and the like. Memory 104 preferably includes a combination of random access memory (RAM), read only memory (ROM) and persistent memory such as that provided by a hard disk drive 118. The computer instructions/applications that are stored in memory 104 are executed by processor 102. The computer instructions/applications 132 and program data 134 can also be stored in hard disk drive 118 for execution by processor device 102. Memory 104.

Those skilled in the art will appreciate that the functionality implemented within the blocks illustrated in the diagram may be implemented as separate components or the functionality of several or all of the blocks may be implemented within a single component. The I/O subsystem 106 may comprise various end user interfaces such as a display, a keyboards, and a mouse. The I/O subsystem 106 may further comprise a connection to a network 190 such as a local-area network (LAN) or wide-area network (WAN) such as the Internet.

The computer system 100 may also include storage 110, representing a magnetic tape drive, an optical disk drive, a CD-ROM drive, and the like. The logs 112 (representing the access logs and the master log) can be stored in storage 110, either locally or off-site. The storage drive 110, which can be removable, reads from and/or writes to a removable storage unit 120 in a manner well known to those having ordinary skill in the art. Removable storage unit 120, represents a floppy disk, a compact disc, magnetic tape, optical disk, CD-ROM, DVD-ROM, etc. which is read by and written to by removable storage drive 110. As will be appreciated, the removable storage unit 120 includes a non-transitory computer readable medium having stored therein computer software and/or data.

The computer system 100 may also include a communications interface 112. Communications interface 112 allows software and data to be transferred between the computer system and external devices. Examples of communications interface 112 may include a modem, a network interface (such as an Ethernet card), a communications port, a PCMCIA slot and card, etc. Software and data transferred via communications interface 112 are in the form of signals which may be, for example, electronic, electromagnetic, optical, or other signals capable of being received by communications interface 112.

Method Embodiment

Figure 2:
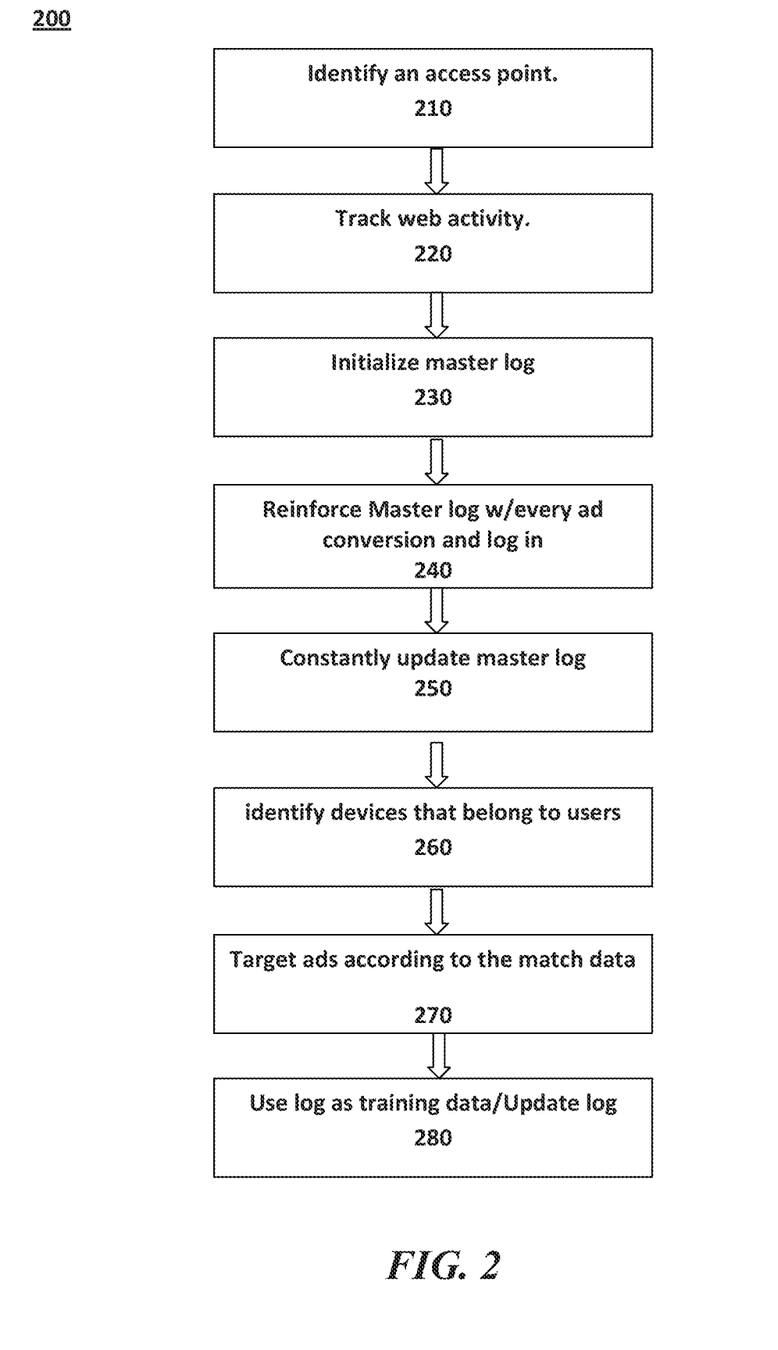
FIG. 2 is a flowchart of a method according to an embodiment of the invention.

Referring now to the flowchart 200 of FIG. 2, we discuss the flow of locking down on the mapping of the device to the user. First in step 210 we need to identify the scope, or area, on which we will focus. This will usually be a gateway and/or access point. Then in step 220 we track the web activity through the identified access point by generating a user interest vector for that access point. The user interest vector is a unique identifier with habits and trends noted at that access point. Note that generating this user interest vector is much easier when the user logs in to a website. For any users that are not logged in, we try to map a known user to the device.

Once we have detected a pattern of web activity that allows us to speculate on the identity of the user we initialize a master log of user interest vectors (with trends, links, time spent on the Web, . . . ) for each user in step 230. In the absence of an ad conversion, a log in, or other identification of a user, only the devices are known. We must rely on estimating the identity of the user based on use trends. This master log is used for learning and identifying and we are constantly correcting/adding/refining the master log. In step 240, for every ad conversion (such as a click on an ad), we confirm or invalidate our assumptions from step 230. Additionally, for every log-in (when the user logs in to an account) we verify or invalidate what we learned. Each log-in serves to either confirm or disprove our assumptions about a user's identity.

We constantly update the master log and confirm any uncertainty and earlier speculations in step 250. So the master log will be partially responsible in identifying devices that belong to certain users in step 260, and later map ads to them in step 270. So whenever a user can be matched with one device, we are then able to easily identify the other devices belonging to that user. We use the master log as training data in step 280. Note the master log may be stored off-site or locally.

In addition, we are able to apply the user interest vector to other users because users with common interests will have similar user interest vectors. For example, assume we have generated a user interest vector for User A who is interested in a local sports team. New User B is found to have a similar interest in the local sports team. We can then apply the user interest vector we generated for User A to new User B. We can simply initialize User A's user interest vector with relevant entries for new User B.

Figure 3:
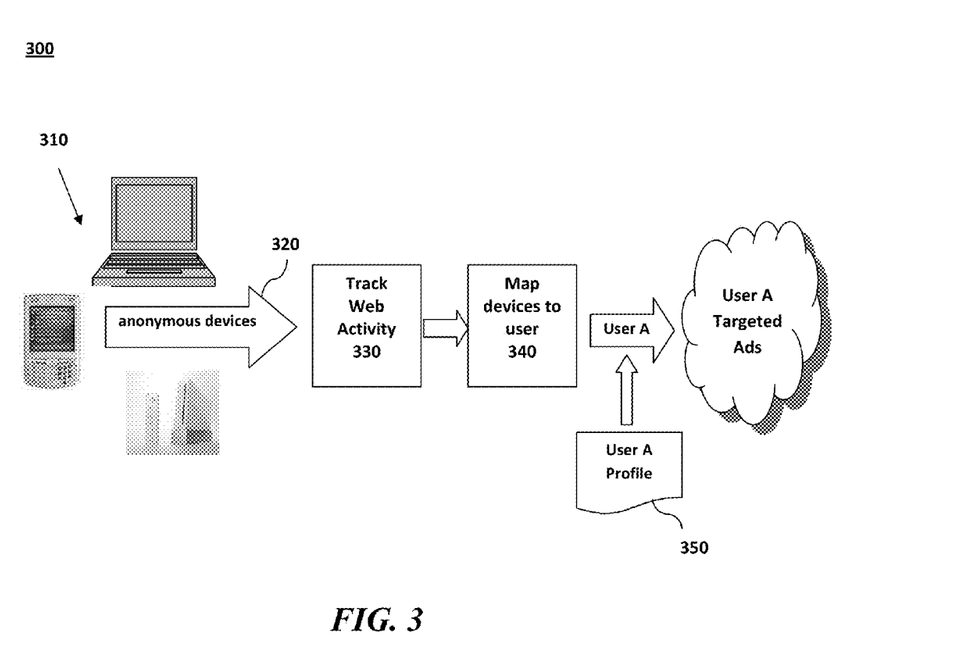
FIG. 3 is a simplified depiction of a process flow for directed ad targeting, according to an embodiment of the present invention.

Referring to FIG. 3, we show a common use case 300 of multiple devices 310, perhaps in the same household, accessing the Internet through one IP address or gateway 320. Assume User A owns multiple devices (a laptop, a mobile phone, a tablet computer). On some of these devices, User A prefers to remain anonymous to the Internet (he/she does not log in). Let us assume that User A uses a tablet computer on a fairly regular basis, but never logs into an account when using the tablet. Without this novel method, we would miss out on User A as a target ad customer most of the time that he is on the Internet.

However, by tracking the Internet requests 330 from this common gateway 320, we are able to identify the devices and map them to User A without user A having to log in and specify his/her identity. Once we have the identity of the user, accessing the user's profile 350 is easy and provides more information for populating a master log. User A can then be targeted to receive ads specifically directed toward the derived likes/preferences/habits of that user. Exemplary Use Case:

Tracking User Activity.

Because today's mobile devices include geo-location features, we are able to know when the user is on the go with a mobile device. As the user moves from access point to access point, we repeat the tracking steps for the different access points. These network access points can help track the user activity and patterns of usage can also be updated based on geo-spatial location information available on most smart phones today. Geo-location is just one of the parameters we use to track web activity. We also employ internet use parameters and device type to map devices to their owners.

Geo Location of the user. With billions of people around the world it is impossible to track trends of all users, so users are grouped by location, because most likely their devices are all based in one location. Further, many times, the devices will access the net through the same shared access point. This allows us to focus our attention on one access point at a time. While the user is "stationed" at one access point, we track the web activity through the access point to derive an internet use log. Also, with geo-location we are able to detect that the devices using the shared access point are co-located. In a home use situation, co-location of the devices can indicate that the devices are owned by the same person.

Internet Use Parameters.

A) Web-Sites Accessed: Every person has a set of sites that tend to apply to the person's interest, for example finance sites, football sites, music sites, among others. Keeping this in mind, the system can keep a log and track the sites accessed. Once we have a pattern of access, we can then perform mapping to lock down on the user. See FIG. 4.

B) Activity Trends: These are trends of how the person uses the internet while online, like the font they use for typing, the arrangement of their applications, and the like.

Again, the system can use some of this information to lock down on the identified user. For example, we know that in a household personal computer, each user has his/her own login. Once the user logs in to the PC, a set of applications are initiated upon start-up. When any of these applications connect to the Internet (such as McAfee anti-virus) we are able to record the use of these particular applications. The applications that are launched at start-up, as well as the order in which they are launched, can serve to identify the particular user. By matching use trends, applications used, and habits of use we are able to identify a user.

C) Time of use. This is the time that the user uses the Internet. Adding to this the user profile, the system can use fuzzy logic to identify and/or filter out the possible users. Fuzzy logic is a many-valued logic dealing with reasoning that is approximate rather than fixed and exact. The use of fuzzy logic in completely automated processes is well-known. We use fuzzy logic to fill in the blanks in the equation because mapping the known parameters (the user action+determining time of use+location) to a user profile is not always accurate.

We use the science of approximation to determine which user can be mapped to the device. Assume a user logs in to a particular location at a particular time to one device (device A), and at the same time another device (device B) connects to the Internet from a shared access point. Using the art of fuzzy logic for approximating the time and location of device B, we map device B to the user. Taking an example from a typical real-life scenario, a user at home is enjoying a television program on a tv that is connected to the Internet (device A), and is intermittently using his/her smart phone (device B). At this point the user is not logged in to either device. While checking the stocks on the connected TV (device A) the user then logs in to the Yahoo! Messenger site on the phone (device B). Using fuzzy logic on the known factors of activity and location for device B, we can derive the user of device A. The time of use, activity and location of device B are the fixed factors; while mapping device A to the user is the variance factor.

D) Identity lock-down. Although most users will not log in all the time on all of their devices, the user will have to log in at some point. When that happens, we capture the instance in time when the user logs in to lock down on the device used and then map that device to the user and confirm some earlier predictions and speculation. In addition, we lock down the identity with a conversion.

Device Type. The type of device in use can make individual identification easier. For example, if the user is using a certain mobile device, the system will learn of the individual based on their past usage of that device at the current particular location.

Logs.

Figure 4:
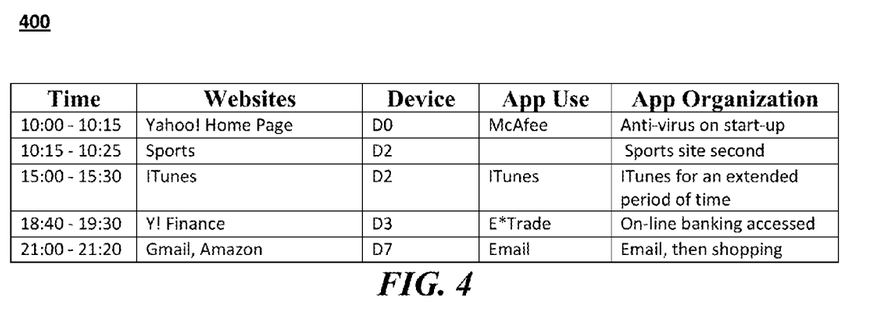
FIG. 4 is an exemplary user interest table, according to an embodiment of the present invention.
Figure 6:
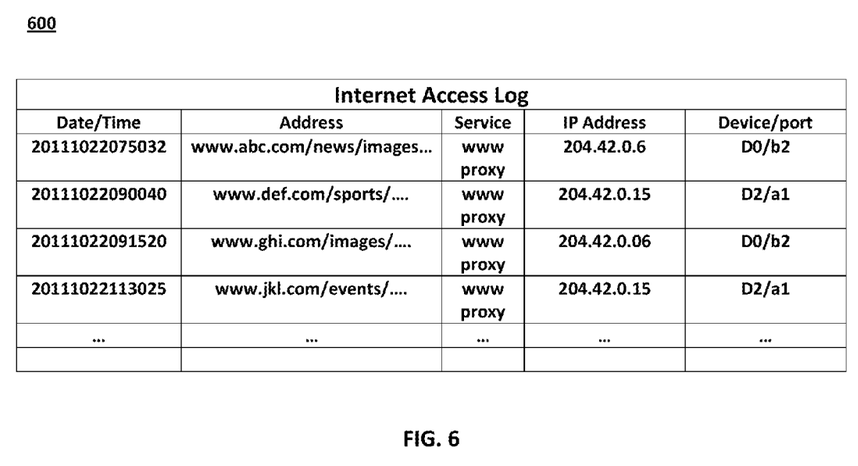
FIG. 6 is an exemplary internet access log, according to an embodiment of the present invention.

Referring now to FIG. 6, because users at home will tend to access the Web on different devices, but use the same access point, access logs 600 are maintained to indicate requests coming from the same shared access point which can be used to track the activity of all users on the same access point. This data is then aggregated and learned over time to produce a "user interest table" as shown in FIG. 4. For example, at home, assume a user will use his blue-ray player and connected TV and desktop machine all from the same access point. He also is likely to spend a large part of his mobile browsing such as App-downloads or movie downloads at home using a Wi-Fi connection.

Figure 5:
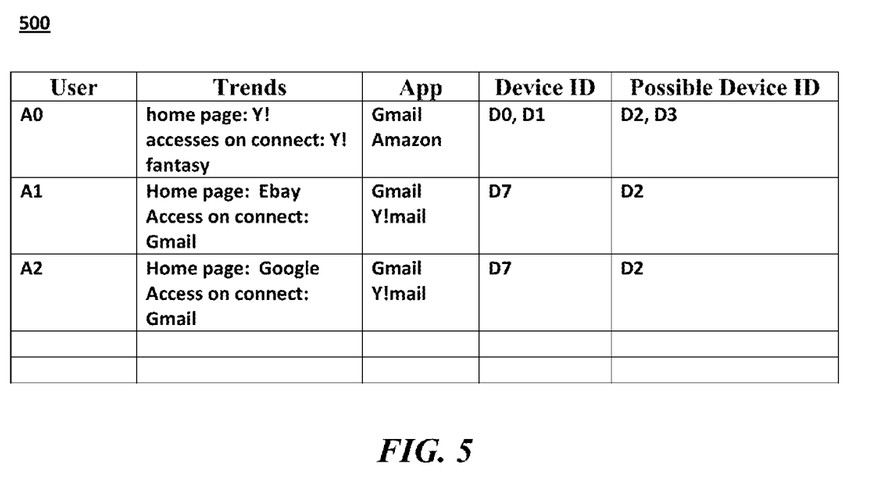
FIG. 5 is an exemplary master log, according to an embodiment of the present invention.

At this point in the processing we have produced a user interest table 400 from tracking the web activity on one access point. We still may not know the identity of the user. What we do know are the devices used on the access point and the pattern of web access from the different devices. Using the information from the user interest table 400, we generate a master log which serves as the link between the device and the user; hence the master log is the key. A sample of a Master Log is shown in FIG. 5. From this example we are able to derive some commonality in the "Possible Device List." For example, users A0 and A1 might both own device D2 because on their familiar trends, the proposed system will adapt with time and alter the mapping based on the self confirmation.

The Master Log of FIG. 5 is a table 500 of all users mapped to devices. In this example, we allocate a row for each user. The table 500 is populated by mapping the devices to the users of the devices. Some mappings are straight forward, such as when a user logs in to a device. Other mappings are derived, such as the example discussed with relation to fuzzy logic. As soon as the system is able to associate a device with a particular user, the system will map the device to the user by adding this information to the table 500. If it is later determined by log in or other means that that device does not belong to its mapped user, the system will edit the table 500 to correct the information.

We track and aggregate multiple parameters of Internet use to create an Internet Access Log 400 (see FIG. 4). From this Internet Access Log 400, we then map users to Internet use in a Master Log 500 (see FIG. 5). This aggregated information can then be used to target ads to the user even when the user is not logged in or is using a different device. In this way we are able to identify the users even if they do not log in. The Internet use parameters in the Activity Log 400 can include: a) websites accessed; b) time of access; c) device used; d) applications; and e) activity trends, and the like.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for directed on-line ad targeting within an access point comprising:
   using a processor device configured to perform:
      selecting an access point;
      maintaining an internet access log;
      tracking web activity on multiple devices within the access point on the internet access log, the multiple devices comprising a first device and a second device;
      matching the first device with a user based upon a determination that the user logged in on the first device;
      tracking multiple parameters of the web activity;
      identifying the multiple devices involved in the web activity;
      distinguishing patterns from the web activity among the multiple devices;

refining an identity of the user in association with the multiple devices based upon the patterns when user identification is unavailable for at least one of the multiple devices;

matching the second device with the user based upon one or more factors comprising an order for launching a first application and a second application at start-up on at least one of the first device or the second device without determining that the user logged in on the second device; and targeting ads to the user across the multiple devices based upon the matching the first device with the user and the matching the second device with the user.

2. The method of claim 1 further comprising:
accessing a profile of the user;
associating the profile with all of the multiple devices mapped to the user.

3. The method of claim 1 wherein the first application comprises an anti-virus application.

4. The method of claim 2 further comprising validating the identity of the user by matching the user's identity with the user's profile after an ad conversion.

5. The method of claim 2 further comprising:
determining that the identity of the user is inconsistent with the profile; and
changing the identity of the user based upon the determination of the inconsistency.

6. The method of claim 1 further comprising providing different personalized advertisements to multiple users within the access point.

7. The method of claim 1 wherein the patterns comprise patterns in at least one of: websites accessed, activity trends, time of use, or type of device used.

8. The method of claim 1 further comprising using geo-location to match users with devices by identifying co-located devices.

9. The method of claim 1 further comprising:
selecting another access point when it is determined that the user is using a device at the another access point; and
repeating the acts of maintaining, tracking, identifying, distinguishing or refining for the another access point.

10. The method of claim 1 further comprising applying a user interest vector of the user to other users whose profile exhibits commonality with the user interest vector.

11. A system for directed on-line ad targeting within an access point comprising:
a memory comprising computer executable instructions that when executed by a processor device enable the system to perform:
selecting an access point;
maintaining an internet access log;
tracking web activity on multiple devices within the access point on the internet access log, the multiple devices comprising a first device and a second device;
matching the first device with a user based upon a determination that the user logged in on the first device;
tracking multiple parameters of the web activity;
identifying the multiple devices involved in the web activity;
distinguishing patterns from the web activity among the multiple devices;

refining an identity of the user in association with the multiple devices based upon the patterns when user identification is unavailable for at least one of the multiple devices;

matching the second device with the user based upon one or more factors comprising a first application and a second applications launched at start-up on at least one of the first device or the second device; and targeting ads to the user across the multiple devices based upon the matching the first device with the user and the matching the second device with the user; and the processor device, operably coupled with the memory, for executing the instructions.

12. The system of claim 11 wherein the computer executable instructions further comprise instructions for matching the second device with the user based upon the one or more factors comprising an order for launching the first application and the second application launched at start-up.

13. The system of claim 11 wherein the computer executable instructions further comprise instructions for:
accessing a profile of the user;
associating the profile with all of the multiple devices mapped to the user.

14. The system of claim 13 wherein the computer executable instructions further comprise instructions for validating the identity of the user by matching the user's identity with the user's profile at log in on one or more device.

15. The system of claim 13 wherein the computer executable instructions further comprise instructions for validating the identity of the user by matching the user's identity with the user's profile after an ad conversion.

16. The system of claim 13 wherein the computer executable instructions further comprise instructions for:
determining that the identity of the user is inconsistent with the user profile when the user is validated by one of an ad conversion or a log in; and
changing the identity of the user based upon the determination of the inconsistency.

17. The system of claim 11 wherein the computer executable instructions further comprise instructions for providing different personalized advertisements to multiple users within the access point.

18. The system of claim 11 wherein the computer executable instructions further comprise instructions for using geo-location to match users with devices by identifying co-located devices.

19. The system of claim 18 wherein the computer executable instructions further comprise instructions for:
selecting another access point when it is determined that the user is using a device at the another access point; and
repeating the steps of maintaining, tracking, identifying, distinguishing, or refining for the another access point.

20. The system of claim 11 wherein the computer executable instructions further comprise instructions for applying a user interest vector of the user to other users whose profile exhibits commonality with the user interest vector.

21. A computer program product comprising a non-transitory computer readable storage medium comprising computer program instructions enabling a device to perform:
tracking web activity on multiple devices within an access point, the multiple devices comprising a first device and a second device;
matching the first device with a user based upon a determination that the user logged in on the first device;

distinguishing patterns from the web activity among the multiple devices;
refining an identity of the user in association with the multiple devices based upon the patterns;
matching the second device with the user based upon one or more factors comprising an order for launching a first application and a second application at start-up on at least one of the first device or the second device; and
targeting ads to the user across the multiple devices based upon the matching the first device with the user and the matching the second device with the user.

* * * * *

UNITED STATES PATENT AND TRADEMARK OFFICE
CERTIFICATE OF CORRECTION

PATENT NO. : 9,600,834 B2
APPLICATION NO. : 13/282180
DATED : March 21, 2017
INVENTOR(S) : Kilroy et al.

It is certified that error appears in the above-identified patent and that said Letters Patent is hereby corrected as shown below:

In the Claims

Column 10, Line 7: Please delete "applications" and insert --application--.

Column 10, Line 29: Please delete "device" and insert --devices--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*